United States Patent [19]

Stephens et al.

[11] Patent Number: 5,490,004
[45] Date of Patent: Feb. 6, 1996

[54] PHOTOCONDUCTIVITY REDUCTION IN CADMIUM TELLURIDE FILMS FOR LIGHT BLOCKING APPLICATIONS USING NITROGEN INCORPORATION

[76] Inventors: Craig Stephens, 4345 Sunnyhill Dr., Carlsbad, Calif. 92008; Thomas C. Borah, 445 Rancho Vista Rd., Vista, Calif. 92083; Tim Kozakai, 926 Shore Crest Rd., Carlsbad, Calif. 92009; Yu-Tai Lee, 8419 Florissant Ct., San Diego, Calif. 92129; Javier A. Ruiz, 5636 Bout Way, Oceanside, Calif. 92057

[21] Appl. No.: 236,987

[22] Filed: May 2, 1994

[51] Int. Cl.$^6$ .......................... G02F 1/1335; G02F 1/135
[52] U.S. Cl. .................. 359/67; 359/71; 359/72
[58] Field of Search .................. 359/66, 67, 71, 359/72; 428/657

[56] References Cited

U.S. PATENT DOCUMENTS

| | | | |
|---|---|---|---|
| 3,824,002 | 7/1974 | Beard | 359/67 |
| 4,019,807 | 4/1977 | Boswell et al. | 359/71 |
| 4,799,773 | 1/1989 | Sterling | 359/67 |

FOREIGN PATENT DOCUMENTS

| | | | |
|---|---|---|---|
| 61-093429 | 5/1986 | Japan | 359/74 |
| 94/27182 | 11/1994 | WIPO | 359/67 |

OTHER PUBLICATIONS

Romeo et al., "Cadmium Telluride P–Type Thin Films Grown by R.F. Sputtering in an Argon–Nitrogen Atmosphere", Thin Solid Films, vol. 143, No. 2, pp. 193–199, 1986.

Primary Examiner—William L. Sikes
Assistant Examiner—Walter J. Malinowski

[57] ABSTRACT

A liquid crystal light valve device exhibiting improved performance capabilities fabricated using a cadmium telluride light blocking layer doped with nitrogen. Because of the incorporation of nitrogen into the cadmium telluride light blocking layer, the layer can be applied using high-speed, low-cost sputtering techniques without resulting in excessive photoconductivity or photoshading. The cost of the addition of nitrogen is minimal. The process of the present invention is amenable to precise control and wide flexibility which results in control of the quality aspects of the light blocking layer such as particulate density.

12 Claims, 3 Drawing Sheets

PHOTOCONDUCTIVITY REDUCTION IN CADMIUM TELLURIDE FILMS FOR LIGHT BLOCKING APPLICATIONS USING NITROGEN INCORPORATION

BACKGROUND OF THE INVENTION

1. Technical Field

The present invention relates to liquid crystal light valves (LCLV's), and more particularly to a liquid crystal light valve employing an improved cadmium telluride light blocking layer.

2. Discussion

Liquid crystal light valves have diverse applications as light amplifiers, projectors and image processors. One prior LCLV is disclosed in U.S. Pat. No. 4,019,807 assigned to Hughes Aircraft Company, and which is herein incorporated by reference. The light valve of that patent employs successive device layers comprising a cadmium sulfide (CdS) photoconductor, a cadmium telluride (CdTe) light absorbing layer, a dielectric mirror, an insulting silicon dioxide layer and a liquid crystal layer. This device structure is sandwiched between indium-tin-oxide transparent electrodes deposited on an optical quality glass flat substrate. The particular function of the CdTe light absorbing layer is to provide several orders of magnitude of light blocking to prevent high intensity light from saturating the photoconductive layer.

U.S. Pat. No. 4,799,773 assigned to Hughes Aircraft Company discloses an improved LCLV device featuring an amorphous silicon conductive layer and a dielectric mirror layer employing titanium dioxide ($TiO_2$). A special bonding structure is used to bond a cadmium telluride light blocking layer to the amorphous silicon. A titanium dioxide-silicon dioxide layered dielectric mirror is then applied to the cadmium telluride light blocking layer.

The titanium dioxide layer disclosed in U.S. Pat. No. 4,799,773 provides greatly improved resolution and spectral capabilities. The amorphous silicon contributes an improved photoconductor response time, approaching the speed required for raster scan displays. The special bonding structure ties the structure together and contributes to an overall improvement in repeatability. The bonding structure includes successive layers comprising first and second $SiO_2$ layers and first and second CdTe blocking layers. The adjacent $SiO_2$ and CdTe layers are oxygen enriched and the device, including the bonding structure, is annealed prior to application of a CdTe layer to redistribute the oxygen. U.S. Pat. No. 3,824,002 assigned to Hughes Aircraft Company, also discloses the use of CdTe as a light blocking layer. Both U.S. Pat. Nos. 4,799,773 and 3,824,002 are herein incorporated by reference.

Most commonly, the cadmium telluride light blocking layer is applied using an evaporation process. However, for high throughput applications, evaporation is not suitable because it is too slow, the equipment is costly, labor and overhead are high, and the vacuum must be broken during the manufacturing process. Thus, it would be desirable to provide an alternative to the evaporation process for producing a cadmium telluride light blocking layer in LCLVs in high volume applications.

Sputtering is an alternative process which avoids many of the disadvantages of evaporation. Sputtering improves throughput, requires less costly equipment, requires lower labor and overhead, and does not require breaking vacuum during the process. However, the performance of LCLV's using sputtered cadmium telluride light blocking layers have not been entirely satisfactory. This is because of a phenomenon called "photoshading". Photoshading results in uneven output brightness across the area of the LCLV. It appears to be related to an instability in photoconductivity, since it is not immediately apparent but only manifests after a burn-in period.

The causes of photoshading are not completely understood. However, the phenomenon does seem to be related to the CdTe sputtering target. That is, photoshading is much worse with some targets than others. However, with high-volume, cost-sensitive applications, it is impractical to use only certain targets, particularly since it is not certain in advance which targets will produce photoshading and which will not.

Accordingly, it would be desirable to provide a technique for sputtering cadmium telluride light blocking layers in LCLVs which yields stable devices that do not exhibit photoshading. It would further to be desirable to provide such a technique which is inexpensive and easily implemented for high-volume applications. Also, it would be desirable to provide a technique for sputtering cadmium telluride light blocking layers which can tolerate normal variations in cadmium telluride targets and which does not produce photoshading with certain targets. Further, it would be desirable to provide such a technique which results in low particulate on the light blocking layer.

SUMMARY OF THE INVENTION

Pursuant to a first aspect of the present invention a liquid crystal light valve is provided which includes a substrate and a photoconductive layer formed on the substrate. A blocking layer comprised of cadmium telluride doped with nitrogen is formed over the photoconductive layer. A mirror layer is then formed over the light blocking layer. In a preferred embodiment, bonding layers are utilized below and above the light blocking layer to improve the bonding of the light blocking layer to adjacent layers.

In accordance with the another aspect of the present invention a method for producing a light blocking layer in a liquid crystal light valve is provided. The method includes the step of sputtering a cadmium telluride blocking layer in an atmosphere containing an argon and nitrogen mixture.

As a result, the present invention provides a liquid crystal light valve and a method for producing such light valves which provides an improved cadmium telluride light blocking layer which can be generated by means of sputtering at high volume and which does not produce undesirable photoshading effects.

BRIEF DESCRIPTION OF THE DRAWINGS

The various advantages of the present invention will become apparent to one skilled in the art by reading the following specification and by reference to the following drawings in which.

DETAILED DESCRIPTION OF THE PREFERRED EMBODIMENTS

Figure 1:
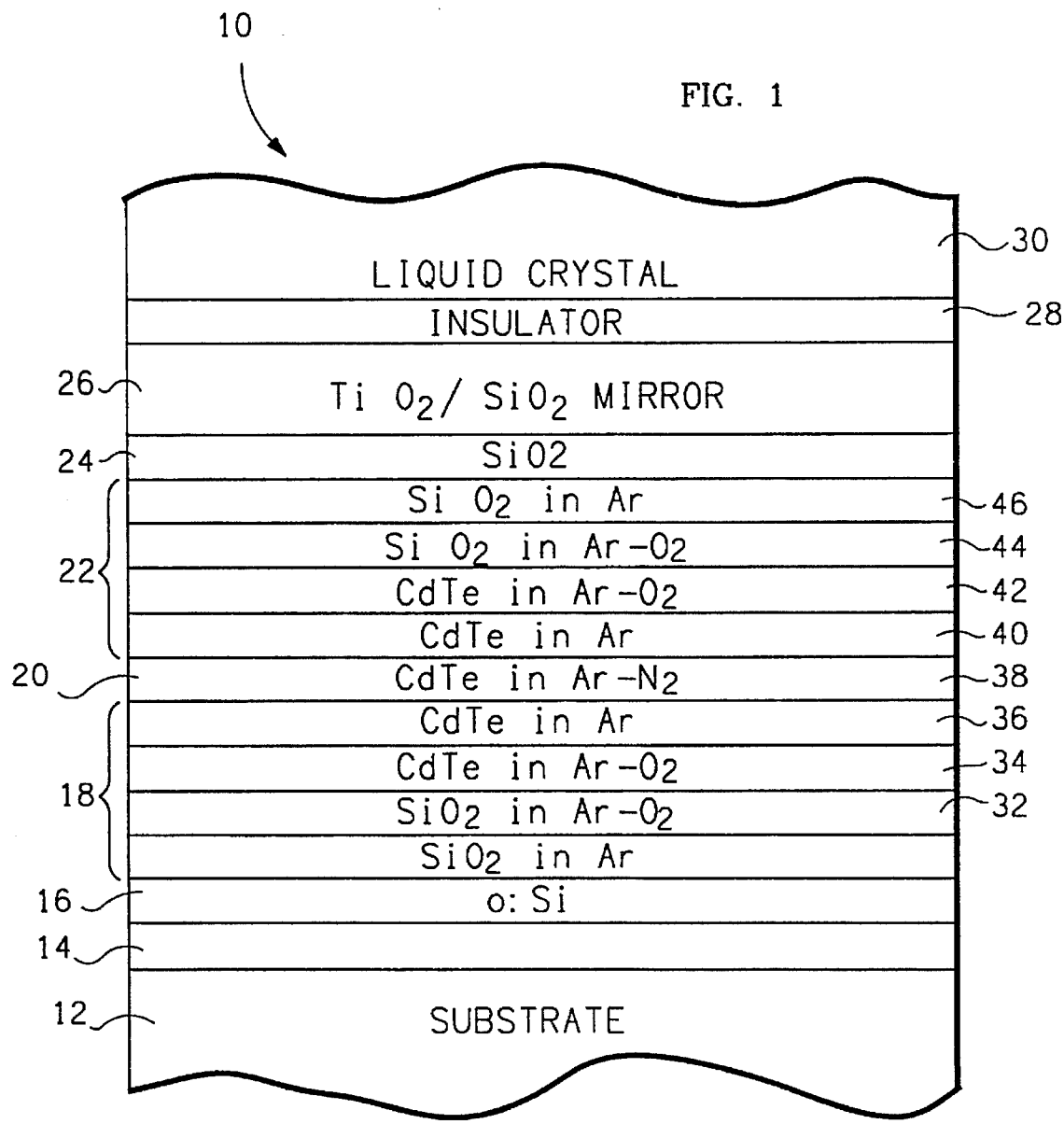
FIG. 1 is a diagram of a liquid crystal light valve utilizing the cadmium telluride light blocking layer in accordance with a preferred embodiment of the present invention.

The preferred LCLV structure is shown in cross-section in FIG. 1. The LCLV 10 includes a suitable glass substrate 12, an indium-tin-oxide (ITO) layer 14, and amorphous silicon photoconductive layer 16, a first silicon bonding structure 18, a CdTe blocking layer 20 a second silicon bonding structure 22, an $SiO_2$ layer 24 and a $TiO_2/SiO_2$ dielectric mirror 26. On top of mirror 26 is an insulator layer 28 and a liquid crystal 30. The silicon bonding structure 18 includes four layers 32, 34, 36, 38. The four layers 32–38 respectfully comprise a first layer 32 of silicon dioxide ($SiO_2$), a second oxygen-rich layer 34 of silicon dioxide, an oxygen rich layer 36 of CdTe, and a second layer 38 of CdTe.

The first $SiO_2$ layer 32 is fabricated by deposition in an argon atmosphere, while the second oxygen-rich layer of $SiO_2$ 34 is deposited in an atmosphere comprising argon and oxygen. The first oxygen-rich layer 36 of CdTe is deposited in an atmosphere also comprising argon and oxygen, while the second CdTe layer 38 is deposited in an atmosphere of pure argon.

Above the second CdTe layer 38, the CdTe blocking layer 20 is deposited. The CdTe layer 20 is deposited in an argon-nitrogen atmosphere as described in more detail below. Above the CdTe layer 20 a second silicon bonding structure 22 is deposited. This silicon bonding structure 22 comprises four layers 40, 42, 44 and 46. The silicon bonding structure 22 is identical to the previous silicon bonding structure 18 except that the order of the layers are reversed. Thus, layer 40 is the same as layer 38, layer 42 is the same as 36, layer 44 is the same as layer 34 and layer 46 is the same as 32. The silicon bonding structures 18 and 22 improve the adherence of the CdTe to minimize the occurrence of peel up and blister.

Above the $SiO_2$ layer 46 an $SiO_2$ layer 24 is deposited. Above the $SiO_2$ layer 24 is the $TiO_2/SiO_2$ dielectric mirror 26, which included 24 layers which alternate between $TiO_2$ and $SiO_2$. Further details of the rest of the structure and construction of the LCLV is as known in the prior art and shown for example in U.S. Pat. No. 4,019,807.

It should be noted that the cadmium telluride light blocking layer 20 must be highly resistive and also must be highly absorptive to maintain opacity. The narrow band semiconductor nature of cadmium telluride is suited to this application. Unfortunately, when the CdTe light blocking layer is sputtered, the above-discussed photoconductive properties with resultant photoshading is observed. In particular, it appears that when the atomic ratio of the material is near one-to-one cadmium to tellurium, the result is an unstable and non-uniform conductivity that varies over time. It is thought that the problem with the control of cadmium telluride stoichiometry is due to the sensitivity of the atomic ratio to conditions in the immediate area of the sputtering which results in drastic swings in the deposited film characteristics. This results in an unacceptable photoshading phenomenon for liquid crystal light valve applications. As discussed above, while the prior approach of evaporating the cadmium telluride light blocking layer does not produce photoshading it is not suited to volume production because of handling (loading and unloading the system), throughput (long cycle times are mandated) and associated processing issues such as annealing and other processes such as intermediate hole elimination.

In order to achieve the advantages of sputtering without the resultant photoshading problem, the present inventors have discovered that the incorporation of nitrogen into the cadmium telluride light blocking layer eliminates the instability and reduces the photoconductivity which apparently causes the photoshading phenomenon. While some sputtering targets do have an atomic ratio that appears to preclude this photoconductivity, the target manufacturing processes is not reproducible and obtaining consistent targets is extremely difficult, costly and unpredictable. Furthermore, the sputtering targets that do produce films with low or no photoconductivity are not necessarily those which have the lowest particulate production so that the quality of the display cannot be optimized. One alternative approach is the alteration of the sputtering process which can alter the film properties but this approach does not alter these properties sufficiently and does not permit the simultaneous minimization of the particulate density.

The addition of nitrogen to the CdTe layer in accordance with this invention is easily controlled to a very precise level with wide flexibility using well-known technology (e.g., mass flow controllers) and can be used with targets and sputtering conditions that do optimize the quality aspects of the deposited film and hence the resultant LCLV display. Furthermore, the cost of nitrogen is almost negligible when compared to the high cost of finding otherwise acceptable targets. Nitrogen is widely available in high purity.

There are two easily implemented methods for adding nitrogen to the sputtering process: 1) the use of a cylinder of premixed argon and nitrogen at the desired percentage, or 2) the use of a manifold mixing system appended to the sputtering system with mass flow controllers to adjust the mixture in a precise fashion. The latter method is preferred in accordance with the present invention. The pressure is maintained as without nitrogen addition, by a throttle valve on the vacuum pump. No changes in power, pressure or other parameters are necessary.

It should be noted that the level of nitrogen is important. At levels that are too high, a brittle film is obtained and particulates are difficult to control. At levels of nitrogen that are too low, photoconductivity will be present to an increasing degree. The ideal percentage of nitrogen (that is, mole percentage as opposed to weight percentage) has been found to be approximately one percent. At 0.25 percent there may be insufficient nitrogen, and at 2.0 percent there are problems with poor mechanical stability. The ability to vary the nitrogen also allows the sputtering to operate at powers which permits the optimization of cosmetic properties while adjusting the nitrogen level to correct the electrical properties to achieve an optimum for both parameters.

Figure 2:
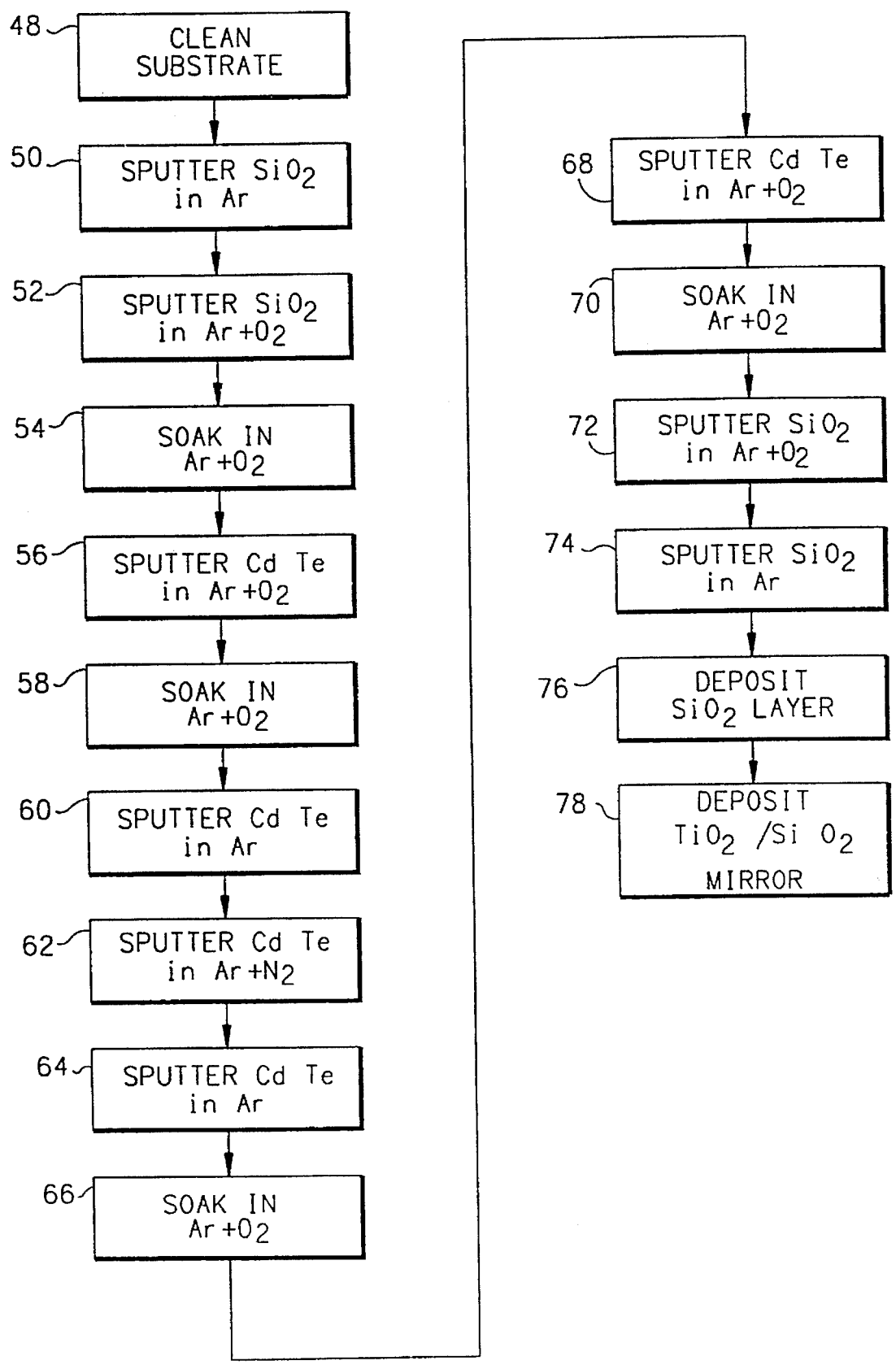
FIG. 2 is a flow block diagram illustrating the fabrication of a liquid crystal light valve device according to a preferred embodiment of the present invention.

Referring now to FIG. 2, a step by step process for depositing the cadmium telluride light blocking layer and bonding layers in accordance with a preferred embodiment of the present invention is shown. This process may be carried out on a commercially available machine such as the PDS II In-Line Sputter System, manufactured by M.R.C. Corporation of Orangebury, N.Y.

According to this process, the glass substrate 12 is first cleaned (step 48) by sputtering etching at 200 watts in 7.75±0.25 microns of argon for three minutes. Alternatively this step can be omitted. The substrate will already have the electrode 14 and amorphous silicon photoconductor layer 16 formed on top in accordance with the technique taught in U.S. Pat. No. 4,799,773. Silicon dioxide is then sputtered in the DC mode onto the substrate 12 for eight minutes at 200 watts in 7.75±0.25 microns of argon (step 50). At the end of step 50, the oxygen-poor $SiO_2$ layer 32 is formed.

With the silicon plasma still running, the atmosphere is changed to an argon-oxygen mixture comprised of 7.75±0.25 microns argon and 2.00±0.25 microns of oxygen giving a total mixture pressure of 9.75±0.25 microns. The silicon sputter in this argon/oxygen mix shown in step 52 is continued for eight minutes.

At the end of the eight minute argon/oxygen sputter, step 52, the substrate is allowed to soak for five minutes in the argon/oxygen mixture with the RF generator turned off, step 54. The SiO$_2$ layer 34 is thus formed. Next, in step 56, CdTe is sputtered in the RF mode onto the SiO$_2$ layer 34 for eight minutes at 200 watts in the 9.75±0.25 microns of argon and oxygen. In step 58, the structure is allowed to soak in the argon/oxygen mixture for another five minutes with the RF generator off. At the end of step 58, the oxygen containing CdTe layer 36 is formed.

After soaking according to step 58, a second eight minute sputter of CdTe is performed, step 60. The second sputter operation 60 is performed at 200 watts and in an atmosphere of 7.75±0.25 microns of argon to in the RF mode form the second CdTe layer 38.

It should be noted that the above-discussed U.S. Pat. No. 4,799,773 teaches the above-discussed steps for providing a bonding layer. However, that patent discloses the use of annealing process after step 60. Yet, the present inventors have found this step unnecessary and have achieved satisfactory results without annealing. This is because in the above-described in-line system the sputter depositions are done without breaking vacuum in rapid succession so the equivalent of annealing is done before the films are exposed to air. Also, that patent discloses a sputtering process with bias and in the preferred embodiment of the present invention the sputtering is done without bias. Further, It should be noted that the above-described soak process can be eliminated with satisfactory results.

Next, the CdTe layer 20 is applied in step 62. In the preferred embodiment, CdTe is sputtered in the RF mode without bias for about one hour at about 500 watts by adjusting the flow rates proportionately with mass flow controllers and keeping the pressure constant at about 11 microns. As a result, the nitrogen content is approximately one percent. However, the nitrogen percentage may be varied with varying results as discussed in more detail below. Also it will be appreciated the power, time period and other parameters may be varied to optimize for specific applications. As a result of this process in step 62, two microns of CdTe in argon plus nitrogen are applied. It will be appreciated that this thickness of CdTe will provide an optical density of about 5.

Next, the silicon bonding layer 22 is applied. This involves step 64 (which is the same step 60), step 66 (which is the same as step 58), step 68 (which is the same as step 56), step 70 (which is the same as step 54), step 72 (which is the same as step 52) and step 74 (which is the same as step 50).

Next, in step 76, the SiO$_2$ layer 24 is sputtered to a thickness of 1,600 angstroms. The TiO$_2$/SiO$_2$ mirror is thereafter applied by deposition procedures known in the art in step 78. Finally, the insulator layer 28 and liquid crystal layer 30 are applied using known techniques.

Figure 3:
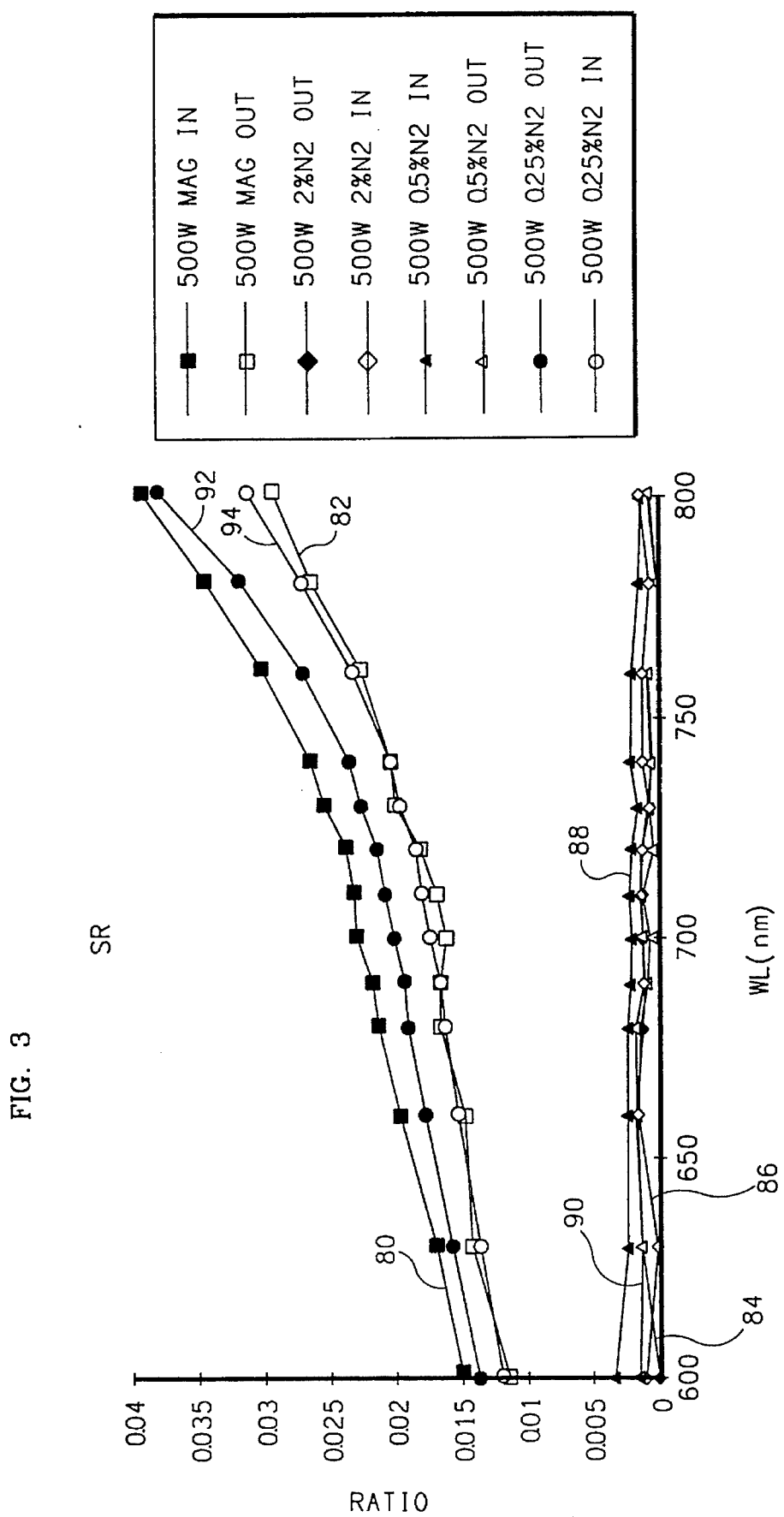
FIG. 3 is a graph of the switching ratio of the liquid crystal light valve device in accordance with the present invention at various levels of nitrogen in the cadmium telluride layer in accordance with a preferred embodiment of the present invention.

Referring now to FIG. 3 there is shown a graph of the results of an LCLV produced with a CdTe light blocking layer doped with nitrogen in accordance with the present invention. This graph plots the switching ratio verses wavelength. The switching ratio is a measure of the photoconductivity, which results in the photoshading affect. In particular, these measurements are taken by depositing a CdTe layer on a substrate having ITO on top. A silver spot is then applied to the CdTe layer which is approximately one-eighth inch in diameter. Six volts is applied between the silver spot and the ITO layer and the current through the CdTe with no illumination on the photodetector is measured. Next the current is measured with a fixed illumination of 200 micro watts per square centimeter. Finally the ratio between the two measurements is taken. An ideal ratio of zero would mean that there is no current with no illumination. All the data is taken at a sputtering RF power of 500 watts. "Mag" indicates data taken with a special magnet, in particular, the magnet behind the target commonly used with "magnetron sputtering" to confine and intensify the plasma for high sputter rates.

All the data is taken either with the substrate as the innermost rotation point or the outermost point which is designated in FIG. 3 as "in" or "out". The first curve 80 thus, illustrates results at 500 watts RF power with the special magnet and at the innermost rotation point of the substrate. Curve 82 is the for same conditions as curve 80 except that the substrate is at the outermost rotation position. Both curves 80 and 82 are taken with no nitrogen in the CdTe light blocking layer 20. Next, curve 84 shows the results for 500 watts power with two percent nitrogen and 98 percent argon in the sputtered CdTe layer 20, with the substrate in the outermost position. Curve 86 is the same as curve 84 with the substrate in the innermost position. Curve 88 shows data taken at 500 watts at 0.5 percent nitrogen and the substrate at the innermost position, while curve 90 illustrates data taken with the same conditions as curve 88 except that the substrate is at the outermost position. Curve 92 illustrates data taken at 500 watts with a nitrogen level of 0.25 percent at the outermost and with the substrate position, and finally curve 94 is with the same conditions as curve 92 except that the substrate is in the innermost position.

It can be clearly seen in FIG. 3 that all four curves 84, 86, 88, 90 having either 0.5 percent or 2 percent nitrogen in the CdTe light blocking layer show a much superior switching ratio than those having no nitrogen, or a reduced nitrogen level of 0.25 percent. This and other data have convincingly demonstrated that the addition of nitrogen effectively solves the problem of photoshading in sputtered cadmium telluride light blocking layers in LCLV devices.

Tests on the resulting LCLVs in accordance with the present invention indicate that the film properties that are affected by the addition of nitrogen include the index of refraction (which is higher), the absorption (which is higher), the resistance (which is maintained high but slightly lower), the uniformity of these parameters across the substrate (reduced deviation), and the photoconductivity (which is reduced). Analysis information indicates that the nitrogen is present as a nitride and all information gathered is consistent with increasing amount of free tellurium being present in the film as the nitrogen is increased. Indication from ESCA analysis is that the nitrogen bonds to excess cadmium and stabilizes the film properties. In any case, the nitrogen stabilizes the film properties of cadmium telluride. Nitrogen addition thus is part of an integrated system that allows high-volume deposition of a light blocking layer along with a dielectric mirror without breaking vacuum and with high speed. This method is highly desirable for products built in high-volume and also for use in such systems. Another property of the deposited CdTe film is the more constant optical coefficients throughout the visible spectrum. In fact, it is possible to adjust the slope of the curve of these properties to a substantial degree by changing the nitrogen percentage.

From the forgoing it can be seen that the present invention provides a liquid crystal light valve having a sputtered cadmium telluride light blocking layer which does not exhibit photoshading. As a result, the light blocking layer can be produced in an easily implemented high-volume and inexpensive manner. Furthermore, the process can tolerate normal variations in cadmium telluride targets and does not require the use of only difficult to obtain targets. Furthermore the technique of the present invention allows the production of devices with low particulate levels in the light blocking layer.

Those skilled in the art can appreciate that other advantages can be obtained for the use of this invention and that modification may be made without departing from the true spirit of the invention after studying the specification, drawings and following claims.

What is claimed:

1. A liquid crystal light valve device comprising:
   a substrate;
   a photoconductive layer formed over said substrate;
   a light blocking layer comprised of cadmium telluride doped with nitrogen formed over said photoconductive layer; and
   a mirror layer formed over said light blocking layer.

2. The liquid crystal light valve of claim 1 wherein said photoconductive layer is an amorphous silicon material.

3. The liquid crystal light valve of claim 1 wherein said blocking layer comprises a sputtered layer of cadmium telluride deposited in an argon and nitrogen mixture.

4. The liquid crystal light valve of claim 1 further comprising means for bonding for said blocking layer to said photoconductive layer.

5. The liquid crystal light valve of claim 4 wherein said means for bonding the blocking layer includes a layer of oxygen-poor silicon dioxide.

6. The liquid crystal light valve device of claim 5 wherein said means for bonding the blocking layer comprises: silicon sputtered in argon to deposit oxygen-poor silicon dioxide; silicon and cadmium telluride each sputtered in an argon and oxygen mixture to deposit silicon dioxide and cadmium telluride with incorporated oxygen; and cadmium telluride sputtered in argon to deposit cadmium telluride.

7. The liquid crystal light valve device of claim 1 further comprising means for bonding said mirror to said cadmium telluride blocking layer.

8. The liquid crystal light valve device of claim 7 wherein said means for bonding said mirror includes a layer of cadmium telluride with incorporated oxygen.

9. The liquid crystal light valve device of claim 7 wherein said means for bonding said mirror comprises: silicon sputtered in argon to deposit oxygen-poor silicon dioxide; silicon and cadmium telluride each sputtered in an argon and oxygen mixture to deposit silicon dioxide and cadmium telluride with incorporated oxygen; and cadmium telluride sputtered in argon to deposit cadmium telluride.

10. The liquid crystal light valve of claim 1 wherein said substrate includes a substrate of silicon having an electrode layer on top.

11. A structure for blocking light in a liquid crystal light valve comprising:
    a cadmium telluride layer deposited by sputtering in an argon and nitrogen mixture.

12. A method for providing a light blocking layer in a liquid crystal light valve device, said method comprising the steps of:
    depositing a cadmium telluride layer by sputtering in an argon and nitrogen mixture.

* * * * *

UNITED STATES PATENT AND TRADEMARK OFFICE
CERTIFICATE OF CORRECTION

PATENT NO. : 5,490,004
DATED : February 6, 1996
INVENTOR(S) : Stephens et al

It is certified that error appears in the above-indentified patent and that said Letters Patent is hereby corrected as shown below:

On title page, item [73],
please insert therefor --Assignee: Hughes-JVC Technology Corporation, Carlsbad, California--.

Signed and Sealed this

Fifth Day of November, 1996

Attest:

BRUCE LEHMAN

Attesting Officer     Commissioner of Patents and Trademarks